(12) United States Patent
Watts

(10) Patent No.: US 6,279,964 B1
(45) Date of Patent: Aug. 28, 2001

(54) MULTIPLE-PIECE ELBOW ASSEMBLY

(75) Inventor: Kenneth A. Watts, Houston, TX (US)

(73) Assignee: Specialty Piping Components, Inc., Houston, TX (US)

( * ) Notice: Subject to any disclaimer, the term of this patent is extended or adjusted under 35 U.S.C. 154(b) by 0 days.

(21) Appl. No.: 08/990,397

(22) Filed: Dec. 15, 1997

Related U.S. Application Data (63) Continuation of application No. 08/706,187, filed on Aug. 30, 1996, now Pat. No. 5,845,386.

(51) Int. Cl.[7] ..................................................... F16L 25/00
(52) U.S. Cl. ........................... 285/179; 285/31; 285/363; 285/181
(58) Field of Search ............................ 285/179, 31, 363, 285/368, 181, 184

(56) References Cited

U.S. PATENT DOCUMENTS

| | | | | |
|---|---|---|---|---|
| Re. 19,132 | * | 4/1934 | McGuirk | 285/181 |
| 758,956 | * | 5/1904 | Buzzell | 285/184 |
| 979,187 | * | 12/1910 | McKee | 285/184 |
| 1,272,794 | * | 7/1918 | Girtanner | 285/179 |
| 1,331,988 | * | 2/1920 | Griffin | 285/179 |
| 1,613,887 | * | 1/1927 | Gunn | 285/179 |
| 2,150,583 | * | 3/1939 | Long | 285/184 |
| 2,450,195 | * | 9/1948 | Grantham | 285/181 |
| 2,459,382 | * | 1/1949 | Hollub | 285/179 |
| 2,557,495 | * | 6/1951 | Bily | 285/181 |
| 3,076,667 | * | 2/1963 | Klinger | 285/179 |
| 3,199,898 | * | 8/1965 | Faccou | 285/181 |
| 4,452,474 | * | 6/1984 | Hagner | 285/368 |
| 4,702,274 | * | 10/1987 | Kramer | 285/179 |
| 4,715,404 | * | 12/1987 | Fusy | 285/181 |
| 5,056,755 | * | 10/1991 | Jang et al. | 285/31 |

* cited by examiner

*Primary Examiner*—Eric K. Nicholson
(74) *Attorney, Agent, or Firm*—Gray, Cary, Ware & Freidenrich, LLP (57) ABSTRACT

A removable connector for use between angled, immovable high pressure lines is disclosed. One embodiment of the connector utilizes a tubular elbow portion having a mating flange on each end and an adapter which mates with one of the elbow flanges. The remaining elbow flange mates with a flange at the end of one of the high pressure lines and the free end of the adapter mates with a flange at the end of the other high pressure line. The mating flange surfaces are frusto-conical in shape and corresponding frusto-conical seal rings are placed between the mating surfaces. The elbow and adapter are adapted to have their respective ends placed at the pipe flanges and their bodies rotated toward each other until their opposite ends mate with each other. The flanges are then bolted together and tightened to ensure sealing engagement and bring the elbow and adapter into alignment with the pipes.

11 Claims, 6 Drawing Sheets

MULTIPLE-PIECE ELBOW ASSEMBLY

RELATED APPLICATIONS

This application is a continuation of Ser. No. 08/706,187, filed Aug. 30, 1996 now U.S. Pat. No. 5,845,386.

FIELD OF THE INVENTION

The present invention relates generally to high pressure flow lines and more particularly to removable connections or closures having multiple pieces which can be assembled in series between substantially immovable high pressure pipes and form a sealed flow path therebetween.

BACKGROUND

Pipe systems for routing fluids may have virtually any configuration. Large systems are normally made of several separate sections which are connected together during construction. These pipe systems generally have a number of bends or angled pipe sections, many of which are found at the point at which the connections are made between pipe sections.

The two most common means for joining sections of pipe are welding and bolting the sections together. For welded connections, the pipes are prepared by cleaning the surfaces of the tapered ends. The ends of sections which are to be welded together do not mate or overlap, but are instead placed face-to-face prior to welding. A section which is to be welded may therefore simply be inserted laterally (parallel to the faces of the pipe openings) between two adjacent sections and welded into place.

In bolted connections, the pipe ends have flanges through which bolts are inserted and then tightened so that the flange faces are held together. Bolted connections typically require gaskets or other types of seals between the flange faces to prevent fluids from leaking out of the pipes at the point of connection. Bolted connections also commonly utilize flanges with mating faces to provide a seal which can withstand greater fluid pressures in the pipe. The mating flange faces have surfaces which are complementary to each other and are usually designed to accommodate seals therebetween.

Pipe sections which have mating flanges must be axially aligned, or nearly aligned, and then moved toward each other to bring the mating surfaces into engagement. Even flat-surfaced flanges used in bolted connections cannot simply be moved laterally into position and bolted because the gasket between the surfaces must be compressed by the surfaces in order to provide the friction fit necessary to seal the connection and prevent movement of the gasket out from between the surfaces. In low pressure systems, this does not normally present a problem because a pipe section which must be inserted between two others can often be installed by flexing the already-installed pipes away from the inserted section. Then, when the pipes are allowed to return to their normal positions, the flange faces of the previously-installed sections spring back toward the flange faces of the new section. The flanges are then bolted together, compressing the seals and securing the connections.

Pipes used in high pressure fluid handling are required to have extremely thick walls (on the order of 50% to 100% of the pipes' inner diameter) in order to withstand the forces exerted by the fluid. As a result, high pressure piping is very rigid and cannot be flexed in the same manner as piping for low pressure applications. Consequently, connection flanges on high pressure piping often cannot be moved enough to allow a single-piece angled joint or elbow with mating surfaces to be inserted or removed. In addition to the fact that thick, high pressure pipe usually cannot be flexed, it is very heavy (because of its increased thickness) and it may require additional support compared to low pressure pipe. The additional support can be provided by stationary mounting brackets which prevent movement of the pipe regardless of how much it can be flexed. Because high pressure pipe usually cannot be moved, angle joints in high pressure pipe systems are formed in the prior art by placing an elbow in position between two pipes and welding the elbow to the pipes.

In normal use, many pipe systems need to be inspected for corrosion or they may contain strainers which must be periodically cleaned. They may also contain valves which occasionally require maintenance which must be performed from the interior of the pipes. It is necessary in these situations to gain access to the interior of the pipe system to allow the cleaning or other service to be performed.

In prior art systems in which the joints to be removed are welded into place in the system, access to the pipe interior can only be obtained by cutting a joint out of the system and then re-welding the joint into place after the adjacent pipes are inspected or the appropriate maintenance is performed. If, on the other hand, the connections are made with a removable means such as bolted flanges, pipe access requires only loosening and removal of the bolts and reinstallation of the bolts after the pipes are serviced.

The removal and replacement of welded joints is very time-consuming and costly in comparison to the removal and replacement of bolted joints. Clearly, it takes less time to loosen the bolts of a flange than to completely cut through the thick walls of high pressure pipes and it is equally apparent that the level of skill required to loosen the bolts is less than that required to safely operate a cutting torch. The same is true of tightening the bolts in comparison to making numerous welding passes around the joint. It is somewhat less obvious, though equally significant, that welded connections must be inspected using x-ray equipment to ensure the integrity of the weld. Also, every time a welded joint is cut out of a pipe system, the section which is removed is actually shortened so that it must either be built up to its original length or replaced with a new joint.

Because a welded joint requires extra time to remove, replace and inspect, and because it may require extra materials, it is typically much more costly than a bolted joint. Unfortunately, as noted above, there are systems in which prior art bolted connections could not be used because the pipe sections simply could not be properly positioned between substantially immovable pipes.

It is therefore an object of the invention to provide an easily removable pipe section which can be used to make a connection between pipes which cannot be moved with respect to each other.

It is another object of the invention to provide a means for removably connecting two non-movable, non-parallel pipes, the connecting means utilizing mating faces to produce a seal capable of withstanding increased internal pressures.

It is yet another object of the invention to provide a means for making angled connections between stationary high pressure pipes which is quick, inexpensive and easy to assemble and disassemble so that the pipe interior is easily accessed.

SUMMARY OF THE INVENTION

As noted above, angle joints in the prior art are welded into place because the ends of the high pressure pipes to which the angle joint must be connected are essentially immovable so that a one-piece angle joint having mating connecting surfaces cannot be moved into position between the pipes. The invention solves this problem by utilizing a two-piece angle joint to make the connection. The preferred embodiment of the invention has an elbow which forms, for example, a 90 degree bend and has a male mating surface on one end and a female mating surface on the other end. The second piece of the joint is an adapter ring which has female mating surfaces on both sides.

The ends of the elbow and adapter which connect to the pipe ends (the "connection ends") are placed against the pipe ends and the bodies of the elbow and adapter are rotated slightly away from each other. In this position, the connection ends of the elbow and adapter touch their respective pipe ends only on the side opposite the other pipe. The elbow and adapter are then slowly rotated toward each other while maintaining contact with the respective pipe ends. As they are rotated, the elbow and adapter gradually near alignment with the pipes and their connection ends make more contact with the pipe ends.

The mating surfaces of the elbow and adapter make contact with each other before the elbow and adapter are completely aligned with the pipes. When the elbow and adapter come into contact, however, the bolt holes of the pipe end flanges and the elbow flanges are sufficiently aligned that bolts can be inserted therethrough. When the bolts are inserted and nuts tightened on the bolts, the elbow and adapter are brought into closer alignment with the pipes and their mating surfaces, although they may never come into perfect alignment. The alignment generally is not perfect because the initial contact is made when the mating surfaces (and seals) are out of alignment and the force applied by the nuts and bolts is about 45 degrees out of alignment with the direction of the flange's movement. Nevertheless, the tapered seals used in the preferred embodiment can tolerate the misalignment and still make complete sealing contact around the entire circumference of the connection.

DESCRIPTION OF THE PREFERRED EMBODIMENT

Referring to the Figures, the preferred embodiment of the invention 1 is shown. The preferred embodiment has an elbow 2 and an adapter 3 which are connected to pipe end flanges 4 and 5. Elbow 2 has a section of high pressure pipe 23 which makes a 90-degree bend and two flange sections 24 and 25 which are welded together to form the single piece elbow 2. Elbow 2 has flanges 6 and 7 which mate with pipe flange 4 and adapter 3, respectively. Thus, a first pipe 8 having a flange 4 is connected to elbow 2 via flange 6. The other end of elbow 2 has flange 7 which mates with adapter 3 and is connected to second pipe 9 via flange 5.

Elbow 2 of the preferred embodiment is characterized by a female mating surface 10 on one flange 6, and a male mating surface 11 on the other flange 7. The male surface of the preferred embodiment has a generally convex portion which is formed by the inner 32 and tapered 31 portions and which extends outward from the outer surface 30. The female surface of the preferred embodiment has a generally concave portion which is formed by the inner 35 and tapered 34 portions and which is recessed from the outer surface 33 so that the convex portion of the male surface fits therewithin. Adapter 3 has two female mating surfaces 13 and 15. The female flange 6 is mated with a male surface 12 on pipe flange 4. On the opposite end of elbow 2, the male mating surface 11 of flange 7 fits against one of the female surfaces 13 of adapter 3. The female surface 15 on the opposite side of adapter 3 mates with the male surface 17 of pipe flange 5.

Flanges 4 and 6 have bolt holes 20 extending therethrough, parallel to the axes of the flanges (the axes of symmetry perpendicular to the respective flange faces). Bolts 21 are placed through the holes 20 and tightened with nuts 22 so that flanges 4 and 6 are held in contact with each other. Flanges 5 and 7 also have bolt holes 20 therethrough to accommodate bolts 21 and nuts 22 which urge the flanges toward each other. Bolts 21 are located around the periphery of adapter 3, but the adapter is not contacted by the bolts. Adapter 3 is instead held in place by male mating surfaces 11 and 17 of the flanges, which are held together by bolts 21.

Each of the mating connections of the preferred embodiment uses an arrangement of tapered portions of the mating surfaces in conjunction with tapered seals. (The conical sections which are sometimes referred to as "frusto-conical" are referred to herein simply as "tapered" surfaces.) The male mating surfaces of the preferred embodiment have an outer annular surface 30, an inner annular surface 32 and a tapered surface 31. Likewise, the female mating surfaces of the preferred embodiment have an outer annular surface 33, an inner annular surface 35 and a tapered surface 34 which mate with surfaces 30, 32 and 31, respectively. Male tapered surface 31 has an angle of 20 degrees with respect to the axis of the flange, while female tapered surface 34 has an angle of 10 degrees. Tapered seal 36 has corresponding tapered surfaces which sit flush against tapered flange surfaces 31 and 34 when the seal and flanges are axially aligned. This geometry has two important advantages over other mating surfaces and seals: it provides sealing contact even when the surfaces (and seals) are not aligned; and when pressure is applied to the interior portion of the seal, it is wedged into the space between the male and female surfaces. The details of this type of tapered seal are disclosed in U.S. Pat. Nos. 4,452,474 and 4,648,632.

The preferred embodiment covers a range of sizes and applications. One example of the preferred embodiment is designed to connect two pipes which have inner diameters of 7.750" (inches) and outer diameters of 12.750". The pipes are oriented with their axes at 90 degrees and each has a male flange at its end. The distance between the outer portion of each of the flanges and the axis of the other pipe is 35.346". The tapered portions of the pipe flanges are angled at 20 degrees and go from a diameter of 13.389" where they meet the outer portions of the flanges to a diameter of 12.539 where they meet the inner portions of the flanges. The inner and outer portions of the pipe flanges are axially displaced from each other by 1.250".

The flange sections of the elbow are 15.375" long and the bend section 23 has a radius of curvature at its axis of 12.000". One of the flange sections has a male flange identical to the pipe flanges and the other has a female flange which has a 10 degree tapered portion which goes from a diameter of 13.533" where it meets the outer portion of the flange to a diameter of 13.117" where it meets the inner portion of the flange. The adapter has two female flanges which are identical to the female flange of the elbow. The adapter has a thickness at its outer flange portions of 6.608" and a thickness at its inner portions of 4.250".

Because of the specific dimensions and geometry of the preferred embodiment, the pipe flanges must both be male, both faces of the adapter must be female, and the elbow must have one male and one female flange. If the pipe flanges were made female, or if the adapter faces were made male, the modified preferred embodiment (i.e., an embodiment having the dimensions described above) could not be assembled. Depending on the geometry of other embodiments, they may or may not be able to utilize flange configurations which differ from the preferred embodiment.

The preferred embodiment is installed between two stationary pipe ends 8 and 9, each of which has an end flange 4, 5 with a male mating surface 12, 17. Two seal rings 36, 37 are placed against the adapter, one against each of the opposing tapered surfaces of the adapter. The seals are held in place with a pair of retainer clips 40, 41. A third seal ring 38 is placed on the tapered portion of the male mating surface 12 of one of the pipe flanges 4. The adapter is placed against the pipe flange 5 so that the mating surfaces of the flange and adapter are in contact with the seal ring 36. The elbow is then oriented with its male flange 7 facing toward the adapter 3 and placed with its female flange 6 in contact with the pipe flange 4 having the third seal ring 38. The elbow is then rotated toward the adapter until its male flange 7 is near the adapter 3.

Figure 1:
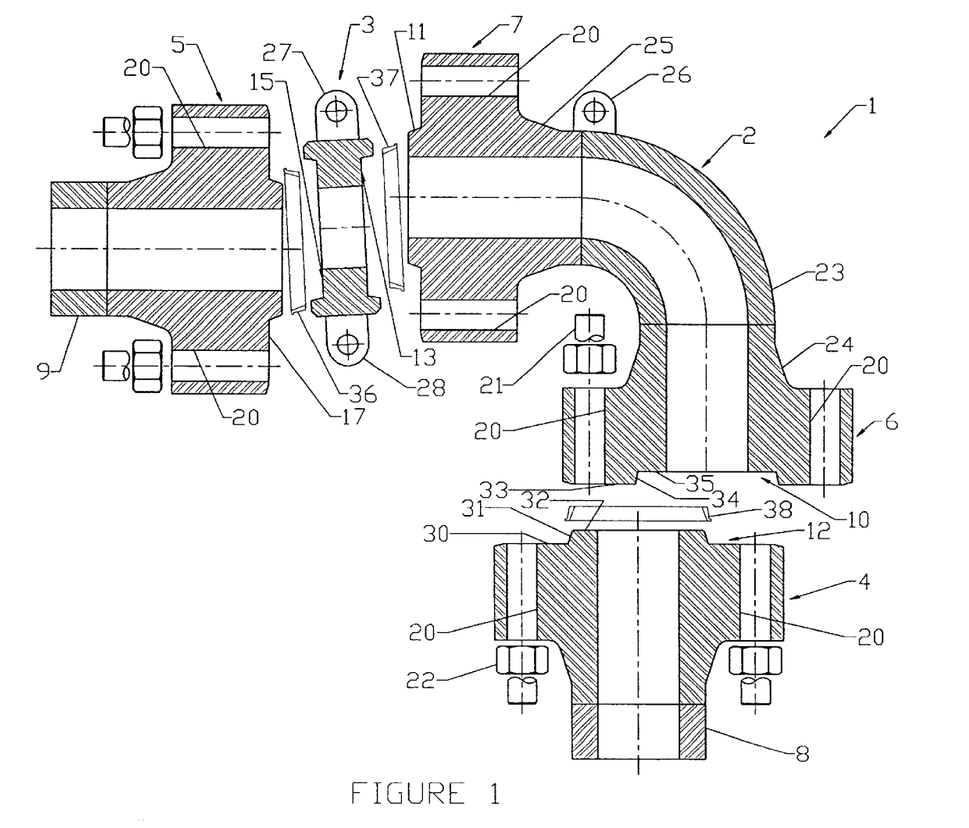
FIG. 1 is a view of the unassembled components of the preferred embodiment.
Figure 2:
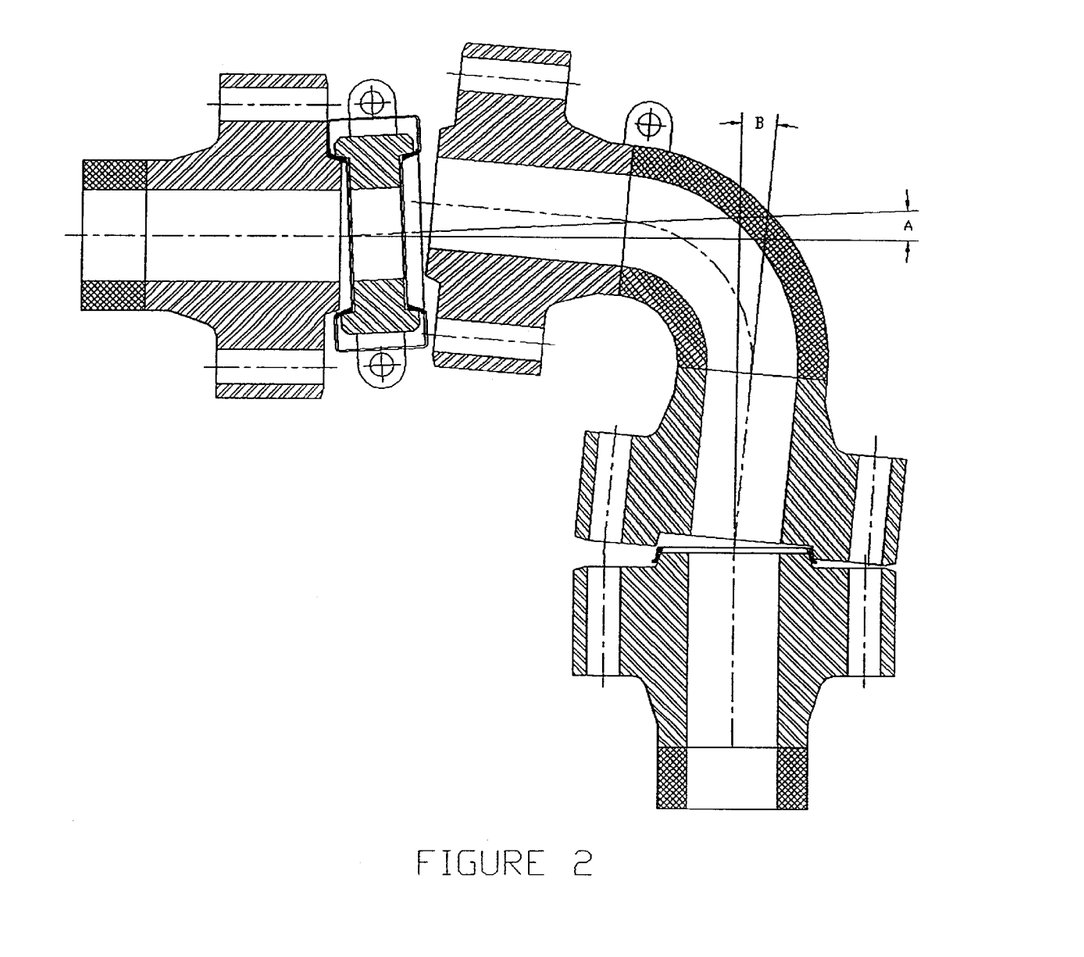
FIG. 2 is a view of the partially assembled components of the preferred embodiment showing the outwardly rotated components.
Figure 3:
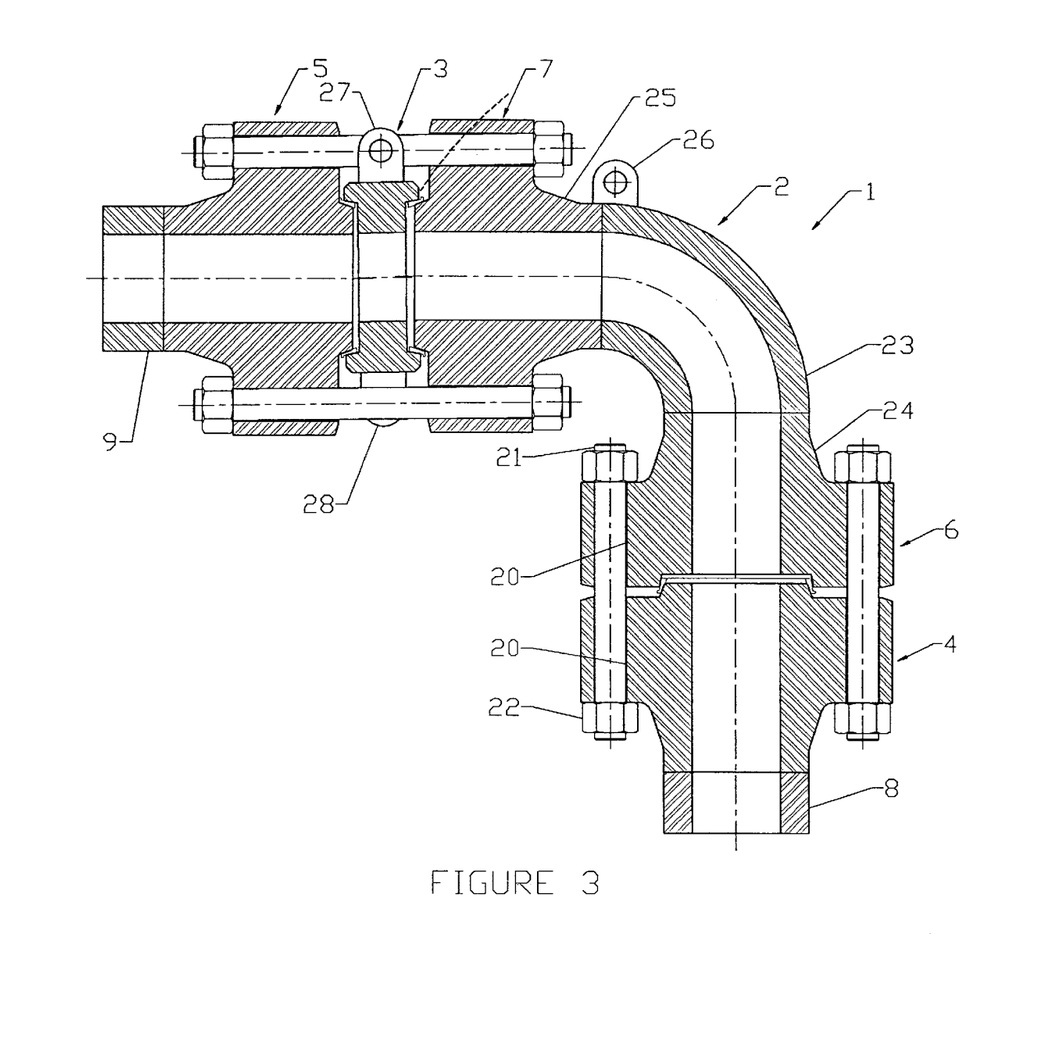
FIG. 3 is a view of the assembled components of the preferred embodiment.
Figure 4A:
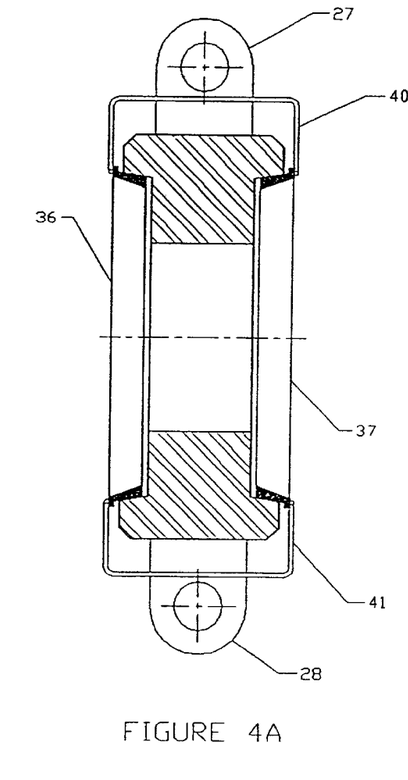
FIG. 4A is a side view of the adapter of the preferred embodiment with seals and seal retainers.
Figure 4B:
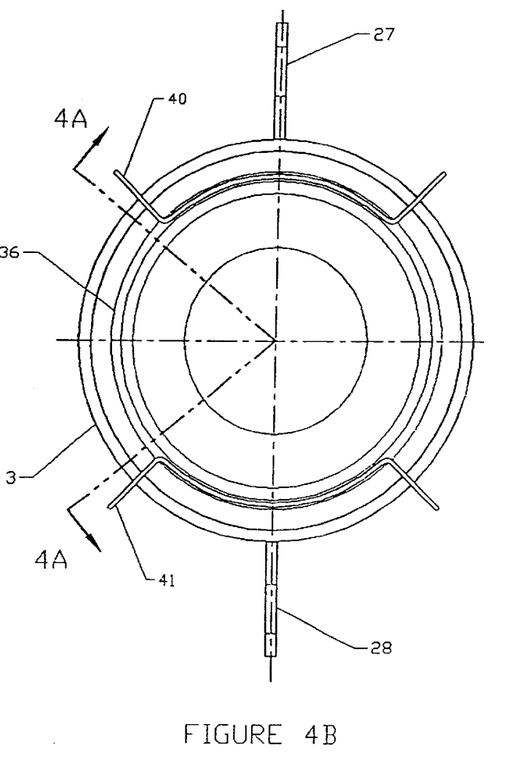
FIG. 4B is a front view of the adapter of the preferred embodiment with seals and seal retainers.

When the adapter 3 is in axial alignment with the pipe flange 5, the male flange 7 of the elbow cannot rotate inward to mate with the adapter because the tapered portion of male surface 11 extends beyond the tapered and outer portions of the adapter's mating surface 13, as well as seal 37, as shown by the dotted line in FIG. 3. The adapter 3 is therefore rotated outward slightly to move the tapered and outer portions 34, 33 of the adapter's mating surface out of the way (see FIG. 1). ("Outward" rotation as used herein is rotation of the adapter and elbow which increases angles A and B, respectively. "Inward" rotation decreases these angles.) After portions 33 and 34 of the adapter's surface are rotated just out of the way, the elbow is rotated inward until its male tapered surface contacts the corresponding female tapered surface 34 of the adapter. Then, both the elbow and the adapter are rotated inward until the male flange 7 of the elbow is sufficiently aligned with the pipe flange 5 to allow bolts 21 to be inserted through the bolt holes 20. As the bolts 21 are tightened and these flanges (both 5/7 and 4/6) are pulled closer together, the elbow and adapter are brought into alignment with the pipes. At the same time, more contact is made with the seals because they are better aligned with the mating surfaces and are compressed by these surfaces.

The process of removing the elbow/adapter connection follows the same steps, but in reverse. First, the nuts and bolts are loosened and removed. Then, the elbow and adapter are each simultaneously rotated outward (note that the direction of "outward" rotation for one is the opposite of the "outward" direction for the other). After the elbow and adapter are rotated enough that the mating surfaces between them are no longer in contact, these parts are removed and set aside.

The preferred embodiment incorporates several lifting and handling lugs 26, 27, 28 which allow the elbow and adapter to be positioned as necessary in the limited working space around the connection. This is particularly important when the connection is designed for systems which are designed to handle especially large volumes or high pressures because the components for the connection must be strong enough, and consequently heavy enough, to handle the extra load. Embodiments which are light enough to be lifted without assistance need not have lifting lugs. When lugs are utilized, they can be used in conjunction with ropes or cables to suspend the components and to rotate them.

Because the mating surfaces of the pipes, elbow and adapter are not aligned when they are placed in contact, the seals between them do not initially make sealing contact around the entire circumference of the respective seal. Even after the bolts through the flanges are tightened, the elbow and adapter are not perfectly aligned with the pipes because of the initial misalignment. The preferred embodiment therefore uses the tapered seals identified above which can tolerate the misalignment and still make sealing contact around their entire circumferences.

The preferred embodiment described above is directed to an application in which the pipes to be connected require a 90-degree bend in the connecting section of pipe. While the invention may be used in connections which make an angle of more or less than 90 degrees (the most common angled pipe connections have bends of 45, 90 and 180 degrees), the applicability of the invention in a particular situation depends on and can be limited by the geometry of the elbow, adapter, pipes and flanges. For example, because the elbow of the preferred embodiment pivots at its point of contact with the tapered seal, the greater the diameter of the tapered surface of the flange surface, the greater the radius of the arc followed by the flange face at the opposite end of the elbow. Similarly, if more than several degrees of outward rotation is necessary to bring the mating faces of the elbow and adapter into contact, the outer flange surface may contact the pipe flange, causing the arc of the opposite elbow flange to be even greater.

If, on the other hand, the bend of the connection is greater than 90 degrees, there is a point at which an elbow does not have to be rotated before it is connected to the pipe flanges. For example, if the elbow makes a 180 degree bend, installing it is a trivial matter, as each of the mating flanges can be aligned axially and the elbow simply bolted onto the pipes. The invention is therefore believed to have utility in systems having bends of at least from 45 to 135 degrees and it is contemplated that the invention has utility in the range of 30 to 150 degrees.

Figure 6:
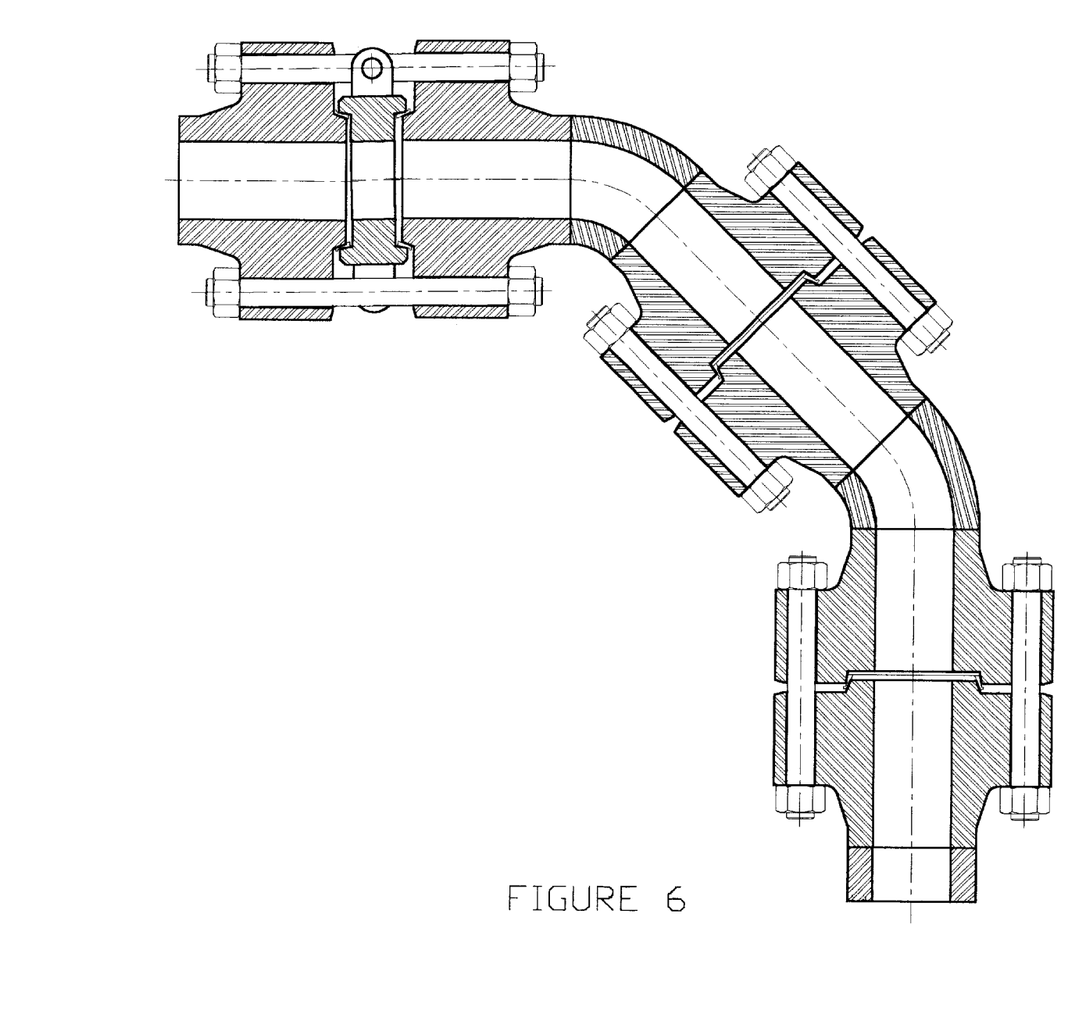
FIG. 6 is a side view of the assembled components of an alternate embodiment having two elbow members.

The preferred embodiment uses an elbow which has a 90 degree bend and an adapter in which both mating faces are parallel and axially aligned. Other embodiments, however, may use other combinations of components, such as two elbows. For example, a 90 degree connection may be made with two 45 degree elbows (see FIG. 6) which are rotated outward from the pipes and then rotated inward to bring their mating faces into contact and bring the respective flanges into alignment so that they can be secured. The connection may also be made with more than two pieces, such as two 45 degree elbows and an adapter. When using more than two pieces to make a connection, it should be kept in mind that the installation and removal process is simpler when there are fewer pieces and the cost and potential for leaks increases when more pieces are used. Therefore, a greater number of pieces probably should not be used unless the geometry of the connection would prevent installation of a two-piece connection.

Figure 5:
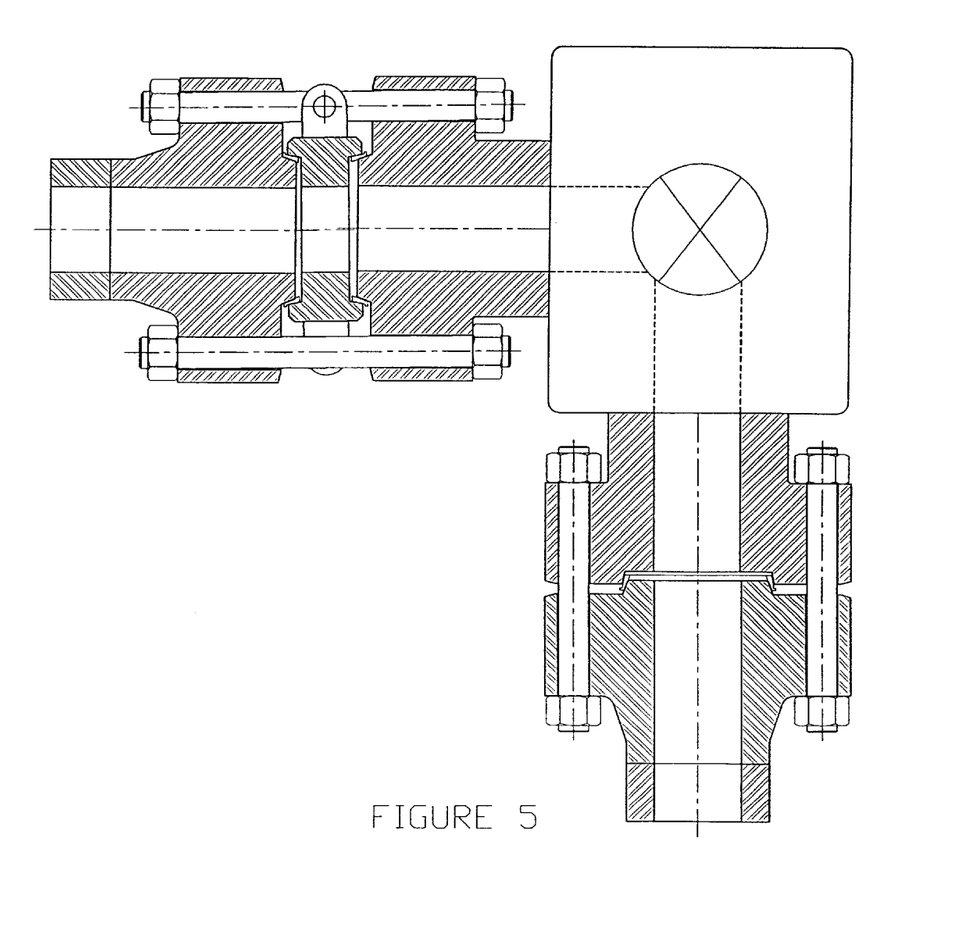
FIG. 5 is a side view of the assembled components of an alternate embodiment having a valve.

Alternate embodiments of the invention may also substitute other functional units for the elbow of the preferred embodiment. For instance, as shown in FIG. 5, a valve having connection flanges at angles to each other may be used in place of the elbow. Any other unit may be used in place of the elbow as long as it has means (e.g., flanges) for connecting it to, and removing it from corresponding connection means on the pipe ends. Likewise, other functional units may be used in place of the adapter. One example of a replacement for the ring adapter of the preferred embodiment is a solid adapter which could be used to block off a section of the pipe system.

The alternate embodiments may use the bolted flanges of the preferred embodiment or any other suitable removable connection means, such as flanges which are held together by clamps instead of bolts. Likewise, the arrangement of mating flange surfaces and tapered seals used in the preferred embodiment are not necessary to practice the invention. Alternate embodiments may use other arrangements of male and female mating surfaces or flat or non-tapered flange faces, and the connections may be made with or without gaskets or other types of seals.

The foregoing description of the preferred embodiment and several alternate embodiments is illustrative of the invention rather than restrictive, and other embodiments of the invention as well as other objects and advantages of the invention will be readily apparent from this description to those skilled in the art. Accordingly, numerous details of the invention may be modified in obvious respects without departing from the scope of the invention.

What is claimed is:

1. A removable multiple-piece angled connector for making a high-pressure connection between a first pipe having a first pipe end with a mating surface and a second pipe having a second pipe end with a mating surface, and providing a path for fluid flow therethrough, the pipe ends being stationary with respect to each other, the pipe ends having axes which are disposed at an angle with respect to each other, the connector comprising:

an elbow member having a fluid flow path therethrough, the elbow member having a first end and a second end, each end of the elbow member having a mating surface for engaging a complementary mating surface;

an adapter having a first side and a second side, each side having a mating surface for engaging a complementary mating surface;

wherein the mating surface of the first end of the elbow member is adapted to engage the mating surface of the first pipe end, the mating surface of the second end of the elbow member is adapted to engage the mating surface of the first side of the adapter, and the mating surface of the second side of the adapter is adapted to engage the mating surface of the second pipe end;

wherein the mating surfaces comprise an annular inner portion, an annular outer portion and a frusto-conical tapered portion between the inner and outer portions; and wherein the elbow member and adapter are adapted to be assembled and disassembled between the stationary pipe ends.

2. The removable multiple-piece angled connector of claim 1, further comprising one or more seals, each seal being disposed between one of a plurality of pairs of the male and female mating surfaces, the seal having an inner surface which is tapered complementary to the tapered portion of the male surface and an outer surface which is tapered complementary to the tapered portion of the female surface.

3. The removable multiple-piece angled connector of claim 2 wherein the angle of the tapered portion of the male surface is greater than the angle of the tapered portion of the female mating surface.

4. A removable multiple-piece angled connector for connecting a first pipe having a first pipe end and a second pipe having a second pipe end and providing a path for fluid flow therethrough, each of the pipe ends having a flange and a mating surface, the pipe ends being stationary with respect to each other, the pipes having axes which are angled with respect to each other, the connector comprising:

a plurality of tubular members, at least one of which is an elbow member, each tubular member having a fluid flow path therethrough, the fluid flow path extending from a first end of the tubular member to a second end of the tubular member, each end of each tubular member having a flange and a mating surface;

the first end of a first one of the tubular members matingly engaging and being removably connected to the first pipe end and the second end of the first tubular member matingly engaging and being removably connected to the adjacent tubular member;

the first end of a last one of the tubular members matingly engaging and being removably connected to the adjacent tubular member and the second end of the last tubular member matingly engaging and being removably connected to the second pipe end;

the remaining tubular members having their first ends matingly engaged and removably connected to the second ends of the adjacent tubular members and having their second ends matingly engaged and removably connected to the first ends of the adjacent tubular members;

the flow paths of the connected tubular members forming a conduit between the pipe ends;

the tubular members being adapted to be installed between the pipe ends and removed from between the pipe ends without moving the pipe ends;

the tubular members being removably connected to each other and to the pipe ends by securing the adjacent flanges to each other.

5. The removable multiple-piece angled connector of claim 4 wherein the flanges have a plurality of holes therethrough and wherein the flanges are secured together by a plurality of bolts which are disposed through the holes and held in place by a plurality of nuts which are threaded onto the bolts and tightened.

6. The removable multiple-piece angled connector of claim 4, further comprising one or more clamps, the clamps being disposed around the flanges to urge the flanges together.

7. The removable multiple-piece angled connector of claim 4 further comprising a plurality of seals, each seal being disposed between a pair of adjacent mating surfaces.

8. The removable multiple-piece angled connector of claim 4 further comprising:

a plurality of seals having a tapered inner surface and a tapered outer surface and wherein:

the mating surfaces comprise a plurality of male surfaces and a plurality of female surfaces, the mating surfaces having an annular inner portion, an annular outer portion and a tapered portion between the inner and outer portions, the tapered portion having the shape of a conical section and having an axis therethrough and being characterized by an angle of the surface with respect to the axis;

the tapered portion and inner portion of the male surface forming a generally convex surface;

the tapered portion and outer portion of the female surface forming a generally concave surface;

the seals being disposed between the male and female surfaces so that the inner seal surface contacts the male tapered surface and the outer seal surface contacts the female tapered surface.

9. A method for removably connecting the ends of two pipes which cannot be moved with respect to each other, the pipe ends having mating surfaces, the pipes having axes through the centers thereof, the pipes being disposed so that the axes intersect and are at an angle with respect to each other, the method comprising the steps of:

providing a first connection member and a second connection member, each connection member having a flow path therethrough from a first end to a second end, each end having a mating surface;

placing the first connection member with the first end thereof against one of the pipe ends so that the mating surface of the first connection member partially engages the mating surface of the pipe end and placing the second connection member with the first end thereof against the other of the pipe ends so that the mating surface of the second connection member partially engages the mating surface of the pipe end;

while maintaining the positions of the pipe ends with respect to each other and maintaining contact between the connection members and the pipe ends, rotating the connection members toward each other until the second ends of the connection members contact each other and the mating surfaces of the second ends of the connection members engage each other;

securing the first ends of the connection members against the pipe ends and securing the second ends of the connection members together.

10. The method of claim 9 further comprising the steps of:

providing a plurality of seals;

placing one of the seals between the first end of each of the connection members and the pipe end to which the connection member is secured;

placing one of the seals between the second ends of the connection members;

compressing the seals between the connection members and pipe ends.

11. The method of claim 10, wherein the step of providing a plurality of seals comprises providing a plurality of seals which have a frusto-conical tapered portion and wherein the step of providing the connection members comprises providing connection members having mating surfaces which include a a frusto-conical tapered portion.

* * * * *